March 24, 1931.  W. GATERMAN  1,797,682
GRAIN LIFTER GUARD FOR MOWING MACHINES
Filed June 12, 1929  2 Sheets-Sheet 1
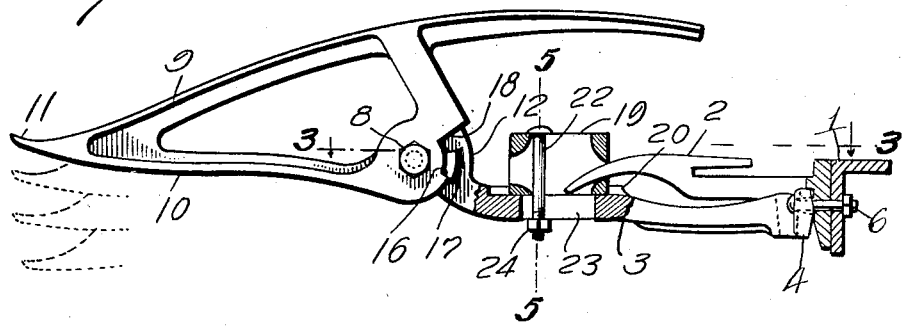
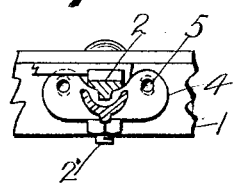 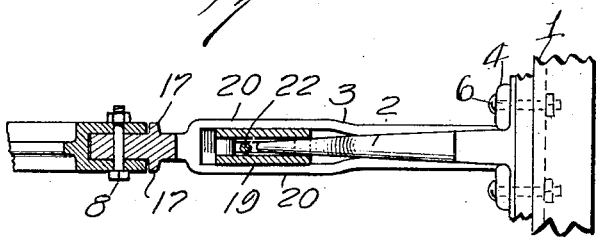
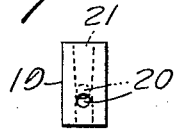 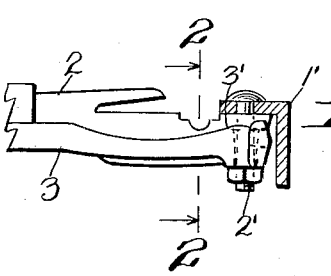
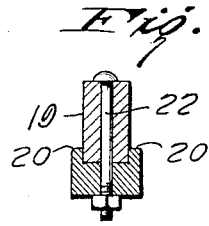 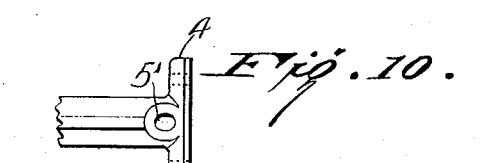
Inventor
W. GATERMAN,
By
Attorneys March 24, 1931. W. GATERMAN 1,797,682
GRAIN LIFTER GUARD FOR MOWING MACHINES
Filed June 12, 1929 2 Sheets-Sheet 2
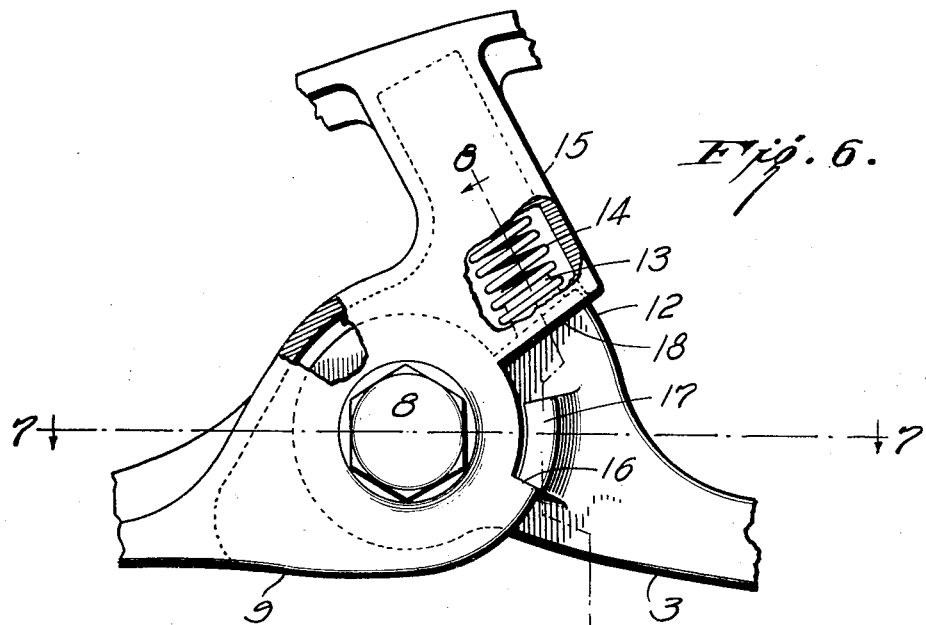
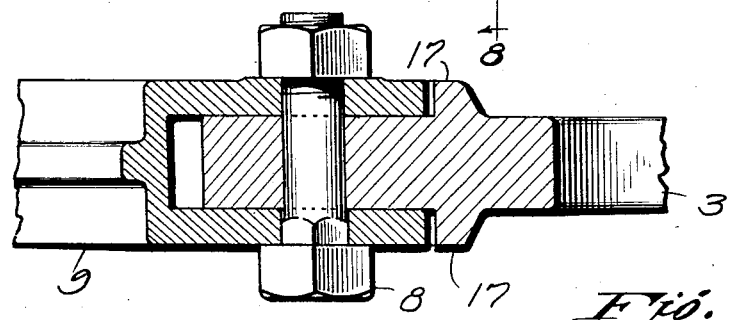
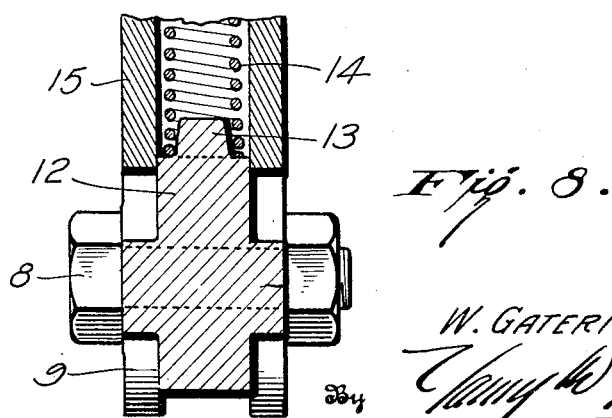
Inventor
W. GATERMAN
By
Attorneys Patented Mar. 24, 1931

1,797,682

UNITED STATES PATENT OFFICE

WILLIAM GATERMAN, OF MANITOWOC, WISCONSIN

GRAIN-LIFTER GUARD FOR MOWING MACHINES

Application filed June 12, 1929. Serial No. 370,185.

This invention relates to grain lifter guards for mowing machines.

Objects of this invention are to provide a novel form of grain lifter guard for mowing machines which is so made that it will receive the downwardly curved ends of the knife guards or will receive straight ended knife guards, and will receive knife guards of different shapes or curvatures; and which will also permit the ready accommodation of the free end of the knife guards, obtaining a bracing action between the grain lifter guard and the knife guard, in addition to the support furnished by different shaped finger bars with the same arm.

Further objects are to provide a grain lifter guard which is provided with a novel form of adjustable block provided with apertures through its forward, rear, upper and lower faces, such apertures being located at different positions with relation to the several faces of the block, so that the block may be reversed end for end and may be turned upside down to provide a multitude of different adjustments, not only to accommodate varying types of knife guards, but also to adjust the grain lifter guard with which the block is positioned, such grain lifter guard being provided with a body portion attachable by either horizontal or vertical bolts to the finger guard bar, and adapted for vertical adjustment.

A further object is to provide a novel form of grain lifter guard which has a joint between the body portion, so made that straw and other material cannot catch and wedge in this joint.

An embodiment of this invention is shown in the accompanying drawings, in which:

Figure 1 is a side elevation of the grain lifter guard with a portion of the mowing machine shown, certain parts being in section;

Figure 2 is a sectional view on the line 2—2 of Figure 9;

Figure 3 is a sectional view on the line 3—3 of Figure 1;

Figure 4 is an end view of the adjustable block;

Figure 5 is a sectional view on the line 5—5 of Figure 1;

Figure 6 is an enlarged detail of the joint between the body portion and the outwardly extending movable portion of the grain lifter guard;

Figure 7 is a sectional view on the line 7—7 of Figure 6;

Figure 8 is a sectional view on the line 8—8 of Figure 6;

Figures 9 and 10 are detail views illustrating the vertical and horizontal openings in a modified form of attaching the body portion of the guard to the finger bar.

Referring to the drawings, it will be seen that the finger bar 1 of a mowing machine has been shown as provided with the usual downwardly curved knife guards 2, one of which is shown in Figures 2 and 3.

The grain lifter guard comprises a body portion 3 which has a rearwardly extending arm provided with flanges 4. The flanges 4, as may be seen most clearly from Figure 2, are provided with spaced openings, through which the attaching bolts 6 for the knife guards 2 are adapted to pass. This construction provides for the vertical adjustment of the grain lifted guard with reference to the finger guard and bar.

In certain forms of standard harvesting machines, the surface of the guard fingers to which the flange 4 is attached is inclined or curved, the present instance disclosing an inclined surface with the flanges 4 curved or rounded as disclosed in Figure 1 to not only provide for adjustment of the lifting guard with reference to the finger guard, but also provide for a rocking movement of the guard so that the same will assume the positions indicated by dotted lines in Figure 1.

It will also be apparent in a great many instances, the surface of the guard fingers to which the flange 4 is attached will also be curved to a certain extent and the curved faces of the flanges 4 may be curved in accordance with the curve on the finger guard so that a certain amount of rocking movement may be imparted to the guard members.

The body portion of the grain lifter guard 3 is hingedly joined by means of a bolt 8 to a forwardly extending movable portion 9. This movable portion is preferably of open work construction, as shown most clearly in Figure 1, and is provided with a curved bottom face 10; and also has a forward tip 11 which is slightly upturned, as shown in Figure 1. The body portion 3 is provided with a curved extension 12 (see Figure 6) which is equipped with a projecting stem 13, (see Figures 6 and 8) upon which a compression spring 14 is seated. The spring is housed within a hollow boot-like member 15, formed integrally with the projecting portion 9 of the grain lifter guard.

This boot-like portion receives the projecting part 12 of the body portion when the grain lifter guard is rocked against the action of the spring. The downward motion of the projecting part is limited by contacting of shouldered faces 16 formed on the projecting portion, with lugs 17 formed on the body portion, as shown in Figure 6.

Further, the lugs 17 strike the bottom face 18 of the boot when the projecting part of the grain lifter guard is rocked to its uppermost position. Thus, the grain lifter guard is limited in its rocking motion. Further, no straw can pack in the joint and thereby prevent free action of the forwardly projecting portion of the grain guard. The spring is completely housed by the boot of the projecting portion and consequently straw can not pack in this part of the apparatus.

Referring again to Figures 1 to 5, it is to be noted that an adjustable block 19 is carried within guides 20 formed on the body portion. This adjustable block may be slid forwardly or backwardly upon the body portion and is provided with a hollow interior, into which a plurality of apertures 21 open, such apertures being formed in the several faces of the block, namely, in the front and rear, and top and bottom faces, as shown particularly in Figures 1 and 4.

Further it is to be noted from Figures 1 and 3 that a bolt 22 may pass through the block in all positions of adjustment of the block, and that this bolt continues through a slot 23 formed in the body portion 3. It is locked in place by means of a nut 24 screwed upon the lower end of the bolt.

Thus, it is possible to accommodate any type of knife guard, and to accommodate the downwardly curved end of such knife guard, as shown in Figure 1. A multitude of adjustments are provided by this construction, as the block may be turned end for end or may be turned upside down, thus providing a great number of differently located apertures for the reception of the knife guard. In addition to this, the block may be slid inwardly or outwardly with reference to the body portion, and also, the body portion may be adjusted upwardly or downwardly with reference to the finger bar. The point 11 of the grain guard may occupy, normally, any number of several positions, as shown in Figure 1, due to this adjustment.

It is thus possible to use the grain guard under greatly varying conditions, to elevate the fallen material, and to cooperate with any of the usual adjustments of the mowing machine.

It will be seen further that this device is very simple and is easy to construct. Further, it is to be noted that the grain lifter guard is of strong, sturdy construction, and is free from fragile or delicate parts. Further, it is to be noted that this grain lifter guard is braced both from the finger bar and the knife guard.

Although this invention has been described in considerable detail, such description is intended as illustrative rather than limiting, as the invention may be variously embodied and as the scope of such invention is to be determined as claimed.

Referring particularly to Figures 9 and 10, in certain mowing machines, such as headers, binders, or the like, the finger bar 1′ is positioned with the top flange extending forwardly and the knife guards 2 are bolted thereto. To accommodate the guard to this modified form already provided, the body portion 3 is provided with a bolt aperture 5′ between the flanges 4 for the reception of a bolt 2′, which bolt extends through the guard body and through the shank of the knife guard, said bolt 2′ being substituted for a shorter bolt which, under ordinary conditions, is employed for securing the knife guard 2.

In the form of the invention illustrated in Figures 9 and 10, the upper face of the rearwardly extending arm on the body portion 3 is formed with a substantially upper shoulder end where guard 2 is bolted, as shown in Figure 9, so that the guard 3 can be rocked and positioned at various angles when desired.

I claim:

1. The combination of a mowing machine having a finger bar provided with a plurality of knife guards and grain lifter guards, each grain lifter guard having a body portion attached to said finger guard and bar, a block carried by said body portion and adjustable thereon, said block having apertures therein, any one of which may receive the point of the adjacent knife guard, and means for adjustably and rockably mounting each body portion on the finger guard bar.

2. The combination of a mowing machine having a finger bar provided with a plurality of knife guards and grain lifter guards, each grain lifter guard having a body portion and means for adjustably and rockably mounting the body portion on the finger guard bar.

3. The combination of a mowing machine having a finger bar provided with a plurality of knife guards and grain lifter guards, a block carried by each grain lifter guard, said block having apertures therein, any one of which may receive the point of the adjacent knife guard, and means for adjustably and rockably mounting each grain lifter guard on the finger guard bar.

In testimony that I claim the foregoing I have hereunto set my hand at Manitowoc, in the county of Manitowoc and State of Wisconsin.

WILLIAM GATERMAN.